(12) United States Patent
Komatsu

(10) Patent No.: US 7,248,395 B2
(45) Date of Patent: Jul. 24, 2007

(54) ELECTROPHORETIC DEVICE AND ELECTRONIC EQUIPMENT

(75) Inventor: Yuko Komatsu, Suwa (JP)

(73) Assignee: Seiko Epson Corporation (JP)

( * ) Notice: Subject to any disclaimer, the term of this patent is extended or adjusted under 35 U.S.C. 154(b) by 25 days.

(21) Appl. No.: 11/328,771

(22) Filed: Jan. 10, 2006

(65) Prior Publication Data
US 2006/0187527 A1    Aug. 24, 2006

(30) Foreign Application Priority Data
Feb. 23, 2005   (JP)   ............................ 2005-046702

(51) Int. Cl.
*G02B 26/00*   (2006.01)
*G09G 3/34*   (2006.01)
(52) U.S. Cl. ........................ 359/296; 345/107
(58) Field of Classification Search ................ 204/450, 204/600, 606; 345/107; 359/296
See application file for complete search history.

(56) References Cited

U.S. PATENT DOCUMENTS 6,671,081 B2 * 12/2003 Kawai ........................ 359/296

FOREIGN PATENT DOCUMENTS

| JP | 64-086116 | 3/1989 |
| JP | 2004-004714 | 1/2004 |

\* cited by examiner

*Primary Examiner*—David N. Spector
(74) *Attorney, Agent, or Firm*—Harness, Dickey & Pierce, P.L.C.

(57) ABSTRACT

An electrophoretic device including a pair of electrodes, an electrophoretic dispersion liquid including an electrophoretic particle and a dispersion medium and having electric properties of electric resistance $R_{ep}$ and capacitance $C_{ep}$, a microcapsule in which the electrophoretic dispersion liquid is enclosed and provided between the pair of the electrodes and a binder layer fixing the microcapsule between the electrodes and having electric properties of electric resistance $R_b$ and capacitance $C_b$, and wherein a ratio of the electric properties of the electrophoretic dispersion liquid and the binder layer satisfies a relationship $R_b C_b \leq R_{ep} C_{ep}$.

5 Claims, 5 Drawing Sheets

$C_{ep}R_{ep}=C_bR_b$ $C_{ep}R_{ep}>C_bR_b$ $C_{ep}R_{ep}<C_bR_b$

ELECTROPHORETIC DEVICE AND ELECTRONIC EQUIPMENT

BACKGROUND OF THE INVENTION

1. Technical Field

The present invention relates to an electrophoretic device and electronic equipment having the electrophoretic device as a-display.

2. Related Art

An electrophoretic device having a pair of electrodes and an electrophoretic dispersion liquid that includes a liquid dispersion medium and electrophoretic particles interposed between the pair of the electrodes has been known. The electrophoretic device can display desired information by controlling amplitude, polarity, waveform and frequency of a voltage applied to the pair of the electrodes and a time period to apply the voltage.

There is a type of the electrophoretic device in which the electrophoretic dispersion liquid is enclosed in a microcapsule in order to stabilize the motion of the electrophoretic particles. A dispersion liquid that consists of a dispersion medium colored with dyes and a more than one kind of the electrophoretic particles dispersed in the dispersion medium is enclosed in the microcapsule. JP-A-64-86116 is a first example of related art. This microcapsule type electrophoretic device has a binder layer that contains the microcapsules and is interposed between a pair of electrodes. Here, one of the electrodes is made transparent. The electrophoretic particles in the microcapsules move according to the polarity of the voltage applied to the electrodes. This property of the electrophoretic device can be used as a display.

JP-A-2004-4714 is a second example of related art. As electronic equipment, a display using the microcapsule type electrophoretic device driven by thin film transistors has also been known.

In the case that the electrophoretic device is used as a display, the electrophoretic particles generally remain at the same position and the display image can be retained even when the voltage application to the electrodes is stopped.

However, in the case of the microcapsule type electrophoretic device, a transient phenomenon occurs at the moment that the voltage application to the electrodes is stopped because of the electric charge stored in the electrophoretic device. At this point, the electric field with the opposite polarity to that of the electric field heretofore applied to the electric charge is temporary impressed upon the electrophoretic particles in the microcapsule. Accordingly, a part of the electrophoretic particles that are regularly retained in the microcapsule corresponding to the polarity (+/−) of the electrodes is moved toward the electrode having the opposite polarity. In other words, the contrast of letters and the like shown on the display is deteriorated compared to the case when the voltage is applied to the electrodes because the part of the electrophoretic particles is moved.

If the electronic equipment has such electrophoretic device as a display (display means), the credibility of the image quality cannot be ensured.

SUMMARY

An advantage of the invention is to provide a microcapsule type electrophoretic device in which the contrast deterioration caused by the transient phenomenon is prevented and electric equipment having the electrophoretic device as a display.

The inventor has reached the following findings as a result of committed study.

The electric field reversal phenomenon mentioned above is related to a ratio of electric resistance to capacitance or conductivity to relative permittivity between the electrophoretic dispersion liquid of the electrophoretic device and the binder layer.

In other words, in the general microcapsule type electrophoretic device, the electric field reversal phenomenon occurs when the above-mentioned properties of the electrophoretic dispersion liquid and the binder layer have specific values that correlate with each other.

Based on the above-mentioned findings, the invention has been completed.

According to a first aspect of the invention, an electrophoretic device includes a pair of electrodes, an electrophoretic dispersion liquid including an electrophoretic particle and a dispersion medium and having electric properties of electric resistance $R_{ep}$ and capacitance $C_{ep}$, a microcapsule in which the electrophoretic dispersion liquid is enclosed and provided between the pair of the electrodes and a binder layer fixing the microcapsule between the electrodes and having electric properties of electric resistance $R_b$ and capacitance $C_b$. A ratio of the electric properties of the electrophoretic dispersion liquid and the binder layer satisfies a relationship $R_b C_b \leq R_{ep} C_{ep}$.

The inventor carried out the following simulation in order to accomplish the invention.

Firstly, a constituent of the microcapsule type electrophoretic device including a single electrode is replaced by the equivalent circuit shown in FIG. 3 and then analysis is conducted.

In the simulation, the following parameters are used: a resistance component $R_{ep}$ of the electrophoretic dispersion liquid, a capacitance component $C_{ep}$ of the electrophoretic dispersion liquid, a resistance component $R_b$ of the binder layer and a capacitance component $C_b$ of the binder layer. Materials of the electrophoretic dispersion liquid and the binder layer are respectively replaced by a parallel circuit composed of a resistor and a capacitor, and these materials are serially coupled each other.

An initial state is a steady state in which a voltage V is applied to the electrodes for an adequate time. After the initial state, the applied voltage V is turned off and the transient phenomenon when the electrodes are set in a floating state is analyzed in the simulation. The variation in the voltages applied to the electrophoretic dispersion liquid and the binder layer is examined.

FIG. 3A shows an ideal equivalent circuit of the microcapsule type electrophoretic device. In the ideal equivalent circuit, the reversal phenomenon of the voltage applied to the electrophoretic dispersion liquid and the binder layer was not confirmed in the simulation. This is because the ideal equivalent circuit does not have a leakage pathway that exists in an actual device. The leakage pathway includes a leakage pathway generated in series with the electrodes, a leakage pathway through the wall of the microcapsule, and other leakage pathway including external system such as a driving circuit.

Therefore, an equivalent circuit shown in FIG. 3B that is made in consideration of the leakage pathway is used in the simulation. Though more than one leakage pathway exist in reality, one resistance component R in the equivalent circuit of the electrophoretic device shown in FIG. 3B is used for descriptive purposes.

In the equivalent circuit made in consideration of the leakage pathway and shown in FIG. 3B, it was confirmed that the reversal phenomenon of the electric field occurs in the simulation with a transient characteristic of the voltage applied to the electrophoretic dispersion liquid and the binder layer.

Three patterns are found in the reversal phenomenon of the electric field according to the ratio of a resistance component to a capacitance component of the electrophoretic dispersion liquid and the binder layer.

The first pattern is that the ratio satisfies a relationship $R_b C_b = R_{ep} C_{ep}$. In this case, the voltage reversal phenomenon did not occur both in the electrophoretic dispersion liquid and the binder layer.

The second pattern is that the ratio satisfies a relationship $R_b C_b < R_{ep} C_{ep}$. In this case, the reversal phenomenon happens in the voltage applied to the electrophoretic dispersion liquid.

The third pattern is that the ratio satisfies a relationship $R_b C_b > R_{ep} C_{ep}$. In this case, the reversal phenomenon happens in the voltage applied to the binder layer.

When the reversal phenomenon of the electric field occurs in the electrophoretic dispersion liquid containing the electrophoretic particle, the contrast deterioration happens.

From the results of the simulation, it is clear that the contrast deterioration in the electrophoretic device is refrained in the case of the first pattern and the third pattern in which the transient phenomenon does not affect the voltage applied to the electrophoretic dispersion liquid.

In other words, the electrophoretic device according to the first aspect of the invention consists of the electrophoretic dispersion liquid and the binder layer that have the electric resistance and the capacitance such that the ratio of the resistance component to the capacitance component satisfies the relationship $R_b C_b \leq R_{ep} C_{ep}$.

Thereby, the reversal of the voltage (electric field) applied to the electrophoretic dispersion liquid is prevented and the electrophoretic particle included in the electrophoretic dispersion liquid does not move and is retained at a predetermined position.

In this way, the contrast deterioration that occurs when the voltage application to the electrodes stops can be prevented with the electrophoretic device according to the first aspect of the invention.

In this case, "$\sigma$" denotes resistivity of the electric resistance and "$\epsilon$" denotes relative permittivity of the capacitance. It is preferred that a ratio of the resistivity to the relative permittivity of the electrophoretic dispersion liquid and the binder layer satisfies a relationship $\sigma_b \epsilon_b \leq \sigma_{ep} \epsilon_{ep}$ where $\sigma_b$ is resistivity of the binder layer, $\epsilon_b$ is relative permittivity of the binder layer, $\sigma_{ep}$ is resistivity of the electrophoretic dispersion liquid and $\epsilon_{ep}$ is relative permittivity of the electrophoretic dispersion liquid.

The relationship between the electric resistance R and the capacitance C can be replaced by a relationship between the relative permittivity and the resistivity. Here, $\sigma_{ep}$ denotes the resistivity and $\epsilon_{ep}$ denotes the relative permittivity of the electrophoretic dispersion liquid, $\sigma_b$ denotes the resistivity of the binder layer, and $\epsilon_b$ denotes the relative permittivity of the binder layer.

The electric resistance in the binder layer is given by $R_b = \sigma_b \epsilon_0 d/S$, where "S" is a superficial area of the binder layer and "d" is a thickness of the binder layer. The capacitance in the binder is given by $C_b = \epsilon_b \epsilon_0 S/d$, where "$\epsilon_0$" is the permittivity of free space.

Accordingly, a time constant parameter of the binder layer is given by $R_b C_b = \epsilon_0 \epsilon_b \sigma_b$. It can tell from the equation that the time constant parameter of the binder layer is independent from the thickness "d" of the binder layer.

In the same manner, the time constant parameter of the electrophoretic dispersion liquid is given by $R_{ep} C_{ep} = \epsilon_0 \epsilon_{ep} \sigma_{ep}$.

Therefore, the relationship $R_b C_b \leq R_{ep} C_{ep}$ can be replaced by the relationship $\sigma_b \epsilon_b \leq \sigma_{ep} \epsilon_{ep}$. The electrophoretic device consists of the electrophoretic dispersion liquid and the binder layer that have the resistivity and the relative permittivity satisfying the relationship $\sigma_b \epsilon_b \leq \sigma_{ep} \epsilon_{ep}$.

Thereby, the reversal of the voltage applied to the electrophoretic dispersion liquid is prevented and the electrophoretic particle does not move. This can prevent the contrast deterioration.

It is preferable that a resistivity adjuster that lowers the binder layer resistivity $\sigma_b$ is added to the binder layer.

The hitherto known binder layer is made of a high resistance material in order to prevent leakage. However, the resistivity $\sigma_b$ of the binder layer is lowered by adding the resistivity adjuster to the binder layer according to the aspect of the invention. In this way, it is possible to prevent the reversal phenomenon of the voltage applied to the electrophoretic dispersion liquid from occurring.

Moreover, the lowered resistivity of the binder layer means that the partial pressure that is put to the electrophoretic dispersion liquid is relatively increased. Accordingly, a higher voltage is applied to the electrophoretic dispersion liquid and this makes it possible to display a clearer and more high-quality image.

It is also preferable that a permittivity adjuster that lowers the binder layer relative permittivity $\epsilon_b$ is added to the binder layer.

The relative permittivity can be reduced by adding the permittivity adjuster to the binder layer while keep satisfying the above-mentioned relationship. In this way, it is possible to prevent the reversal phenomenon of the voltage applied to the electrophoretic dispersion liquid from occurring.

According to a second aspect of the invention, electronic equipment includes the above-described electrophoretic device as a display means.

According to the second aspect of the invention, it is possible to prevent the contrast deterioration when the voltage application to the electrodes stops because it has the above-described electrophoretic device 1 used as a display means. With the electrophoretic device, a clear and sharp image can be displayed. Therefore, it is possible to provide the highly reliable electronic equipment with a high display capability.

BRIEF DESCRIPTION OF THE DRAWINGS

The invention will be described with reference to the accompanying drawings, wherein like numbers reference like elements.

DESCRIPTION OF THE EMBODIMENTS

An embodiment of the electrophoretic device and the electronic equipment having the electrophoretic device as a display according to the invention will now be described.

First of all, structure of the electrophoretic device according to an embodiment of the invention is described.

The electrophoretic device of the invention has a pair of electrodes, a microcapsule in which an electrophoretic dispersion liquid is enclosed and is provided between the electrodes, and a binder layer which fixes the microcapsule between the electrodes. The electrophoretic dispersion liquid consists of electrophoretic particles and a dispersion medium.

Figure 1:
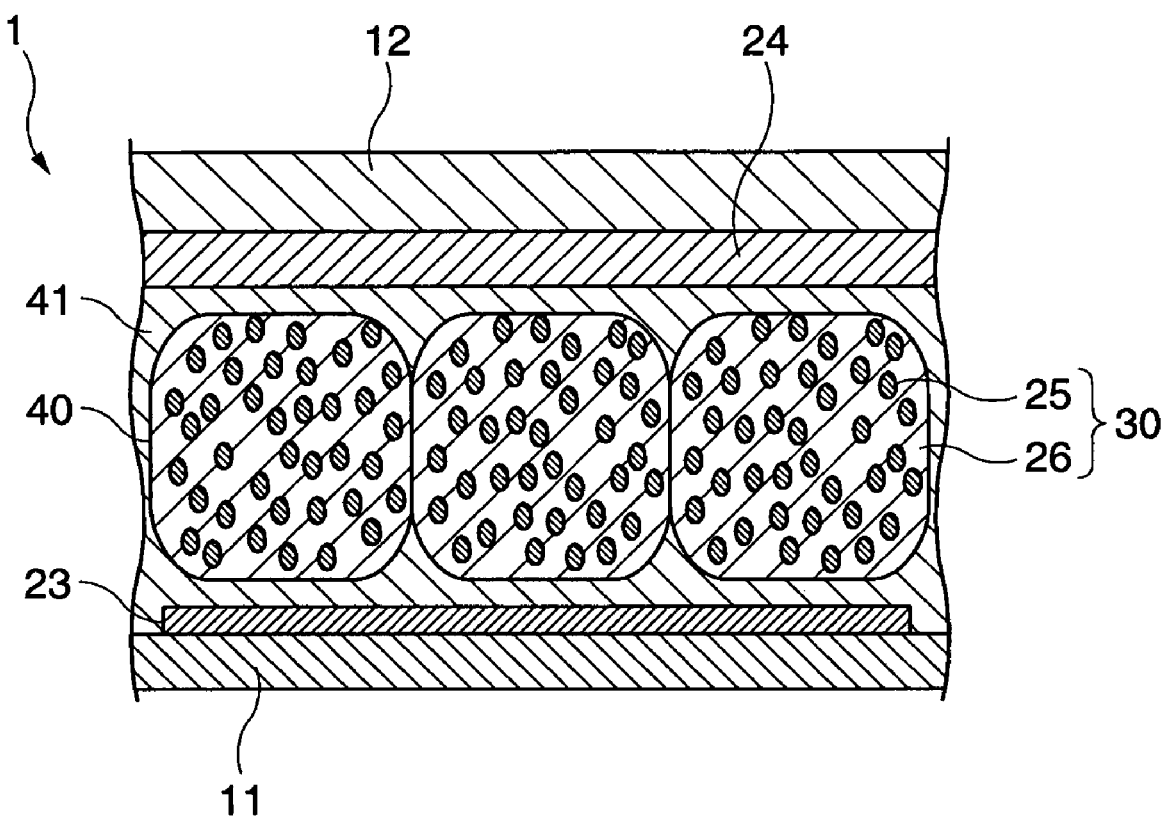
FIG. 1 is a sectional side view of an electrophoretic device schematically showing its structure.

FIG. 1 schematically shows the structure of the electrophoretic device according to the embodiment of the invention. Reference numeral 1 denotes the electrophoretic device in FIG. 1.

As shown in FIG. 1, the electrophoretic device 1 has the pair of the electrodes, a picture electrode 23 and a transparent electrode 24. A microcapsule 40 that contains an electrophoretic dispersion liquid 30 including a liquid dispersion medium 26 and an electrophoretic particle 25 is provided between the pair of the electrodes. The electrophoretic device 1 also has a binder layer 41 that fixes the microcapsule 40 between the electrodes 23, 24.

The above-mentioned electrophoretic device 1 (the microcapsule type electrophoretic device) can serve as a display means by changing the distribution of the electrophoretic particle 25. The distribution can be changed by applying voltage to the electrodes 23, 24.

The picture electrode 23 is formed on a first substrate 11, and the transparent electrode 24 is formed on a second substrate 12. The first substrate 11 and the second substrate 12 oppose each other and hold the microcapsule 40, the binder layer 41, the picture electrode 23 and the transparent electrode 24 therebetween.

Either a flexible substrate or an inflexible substrate can be used as the first substrate 11. However, the flexible substrate is more preferable as the first substrate 11. The electrophoretic device 1 can have flexibility with the flexible first substrate 11. Thereby, the electrophoretic device 1 can be used to form the hereinafter described electronic paper.

The first substrate 11 is made of insulating material such as polyimide, poly-ether-ether-ketone, polyethylene naphthalate, polyethersulfone, polyethylene terephthalate, polyethylene and the like. One or more than one materials mentioned above combined can also be used to form the substrate.

A plurality of electrodes is formed on one inner side (the upper face in FIG. 1) of the first substrate 11 as the picture electrode 23. Each picture electrode 23 serves as one of the electrodes that apply voltage to the electrophoretic dispersion liquid 30 in the microcapsule.

To form the picture electrode 23, for example, metals such as aluminum, nickel, cobalt, platinum, gold, silver, copper, molybdenum, titanium and tantalum and alloys of these metals can be used. One or more than one metals mentioned above combined may also be used to form the picture electrode 23.

The second substrate 12 provided so as to oppose the first substrate 11 is a transparent substrate. The above-mentioned transparent electrode 24 is provided on the lower face (the lower side face in FIG. 1) of the second substrate 12.

In the same way as the first substrate 11, the second substrate 12 is preferably a flexible substrate made of various cellulose series resins, polyester resin such as polyethylene terephthalate (PET) and polyethylene naphthalate (PEN), and other resins such as polyethylene resin, polystyrene resin, polyvinyl chloride resin, polycarbonate (PC), polyethersulfone (PES), poly-ether-ether-ketone (PEEK), polyphenylene sulfide and the like. One or more than one resins mentioned above combined may also be used to form the second substrate 12.

The second substrate 12 and the transparent electrode 24 have a light transmitting property. Preferably, these are substantially transparent (clear and colorless, colored transparent or translucent). In this way, it is possible to visually recognize the hereinafter described state of the electrophoretic particle 25 in the electrophoretic dispersion liquid 30, in other words, the information displayed by the electrophoretic device 1.

To form the transparent electrode 24, for example, conductive resins such as poly acetylene, conductive resins containing conductive metal particles and the like can be used in addition to conductive metal oxides such as indium tin oxide (ITO), fluorine doped tin oxide film (FTO), indium oxide (IO) and tin oxide (SnO2). One or more than one materials mentioned above combined can also be sued to form the transparent electrode 24. Furthermore, the above-described picture electrode 23 may be made of these materials.

A spacer (not shown in the figures) that determines the distance between the picture electrode 23 and the transparent electrode 24 is provided between a circuit substrate 11 and the transparent electrode 24 and near the side face of the electrophoretic device 1. The spacer is provided so as to surround the peripheral of the electrophoretic device 1. The spacer also serves as a seal member that defines an enclosed space 71 between the circuit substrate 11 and the transparent electrode 24.

The electrophoretic device 1 is formed by providing a plurality of the microcapsules containing the electrophoretic dispersion liquid 30 between the above-mentioned substrates.

The electrophoretic dispersion liquid 30 that includes the liquid dispersion medium 26, the electrophoretic particle 25 dispersed in the liquid dispersion medium 26 and a viscosity regulator (not shown in the figures) adjusting the viscosity of the liquid dispersion medium 26 is enclosed in the microcapsule 40. For example, the single microcapsule 40 can form a single electrophoretic element.

According to the above-described electrophoretic device 1, it is possible to simplify the manufacturing processes and easily handle the components of the device because the electrophoretic dispersion liquid 30 is encapsulated in the microcapsule 40. Moreover, it can prevent unevenness in the display caused by maldistribution of the electrophoretic particle 25.

Organic solvents with relatively high insulation can be used as the liquid dispersion medium 26. As such organic solvents, for example, there are aromatic hydrocarbon such as toluene, xylene and alkylbenzene, aliphatic hydrocarbon such as pentane, hexane and octane, alicyclic hydrocarbons such as cyclohexane and methylcyclohexane, halogenated hydrocarbons such as methylene chloride, chloroform, carbon tetrachloride and 1,2-dichloroethane, various mineral and vegetable oils such as silicon based oil, fluorine based oil and olive oil, higher fatty acid ester and the like. Only one of the above-mentioned materials or a mixture of the above-mentioned materials can be used as the liquid dispersion medium 26.

As for the electrophoretic particle 25, an organic or inorganic pigment particle or a complex of the pigments can be used. As such pigments, for example, there are aniline Black, carbon black, or other black pigments, titanium dioxide, zinc oxide, antimony trioxide and other white pigments, monoazo, dis-azo, polyazo and other azo-based pigments, isoindolenone, yellow lead oxide, yellow iron oxide, cadmium yellow, titanium yellow, antimony and other yellow pigments, quinacrilidone red, chrome vermillion and other red pigments, phthalocyanine blue, indanthrene blue, anthraquinone-based dyes, prussian blue, ultramarine blue, cobalt blue and other blue pigments, phthalocyanine green and other green pigments and the like. Mixture of two or more different kinds of particles that have different characteristics such as in hue and electrophoretic quality may also be used as the electrophoretic particle 25.

Such electrophoretic particle 25 is positively or negatively charged in advance. In this embodiment, the electrophoretic particle 25 is positively charged at the initial state.

The liquid dispersion medium 26 is colored with the different color from that of the electrophoretic particle 25. As for the electrophoretic particle 25 enclosed in the microcapsule 40, for example, two kinds of particles colored in different colors may be used. One may be positively charged and the other may be negatively charged.

Various additives may be added to the electrophoretic dispersion liquid 30 that consists of the electrophoretic particle 25 and the liquid dispersion medium 26 as required. For example, electrolytes, surfactants, metal soaps, resins, rubbers, oils, varnish, charge controlling agent comprised of particles of a compound and the like, titanium based coupling agent, aluminum based coupling agent, silane based coupling agent, or other dispersant, lubricant, stabilizers and the like may be added.

Furthermore, anthraquinone-based dyes or azo-based pigments and other pigments may be solved in the electrophoretic dispersion liquid 30 (the liquid dispersion medium 26) as required.

To form the microcapsule 40, for example, an interfacial polymerization method, an in-situ polymerization method, a phase separation method, an interfacial precipitation method, a spray-drying method, and other micro-capsulation methods can be applied. As a capsule wall-film material of the microcapsule 40, for example, gelatin, polyurethane resin, polyurea resin, urea resin, melamine resin, acrylic resin, polyester resin, and other resin material can be used. Such material alone or two or more types combined can be used.

It is preferable that the microcapsule 40 is formed so as to have the same size. With the similar-sized microcapsules, better display capability can be brought to the electrophoretic device 1.

The binder layer 41 is provided around the microcapsule 40. The binder layer 41 fixes each microcapsule 40.

The binder layer 41 is made of a material having a good affinity and adhesiveness with the capsule body of the microcapsule 40, and has an insulating ability.

As the binder material for the binder layer 41, for example, there are polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal and cellulose-based resin. There are also polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, polyether imide, and other polymers. Furthermore, polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, fluororubber, or other fluororesins, silicone resins, silicone rubber, and other silicone resins, can be used as the binder material. As other binder material, methacrylic acid-styrene copolymer, polybutylene, methyl methacrylate-butadiene-styrene copolymer, etc. may be used. Also, such material alone or two or more types combined can be used.

In the electrophoretic device 1 according to the embodiment of the invention, the ratio of the electrical property of the binder layer 41 to that of the electrophoretic dispersion liquid 30 satisfies the above-described relationship $(R_b C_b \leq R_{ep} C_{ep})$.

The above-described relationship $(R_b C_b \leq R_{ep} C_{ep})$ can be transposed to $\sigma_b \epsilon_b \leq \sigma_{ep} \epsilon_{ep}$. Accordingly, the same effects can be obtained when the resistivity or the relative permittivity of the binder layer 41 and the electrophoretic dispersion liquid 30 satisfies $\sigma_b \epsilon_b \leq \sigma_{ep} \epsilon_{ep}$.

In order to satisfy the above-mentioned relationship, a specific method is to add a permittivity adjuster or a resistivity adjuster to the above-described binder material.

The relative permittivity can be reduced by adding the permittivity adjuster to the binder layer 41 while keep satisfying the above-mentioned ratio $(\sigma_b \epsilon_b \leq \sigma_{ep} \epsilon_{ep})$.

Meanwhile, the binder layer in the hitherto known electrophoretic device is made of a high resistance material in order to prevent leakage. According to the embodiment of the invention, the resistivity $\sigma_b$ of the binder layer 41 is lowered than that of the hitherto known binder layer by adding the resistivity adjuster to the binder layer 41 while fulfilling the above-mentioned relationship. In this way, it is possible to prevent the reversal phenomenon of the electric field applied to the electrophoretic dispersion liquid 30 from occurring.

Moreover, the resistivity of the binder layer 41 is lowered by adding the resistivity adjuster. This relatively increases the partial pressure that is put to the electrophoretic dispersion liquid 30. Accordingly, a higher voltage is applied to the electrophoretic dispersion liquid 30 and this makes it possible to display a clearer and more high-quality image.

As such permittivity adjuster, for example, there are alcohols such as 1,2-butanediol and 1,4-butanediol, ketone series, carboxylate and the like.

As for the permittivity adjuster, it is preferable that carbon based material such as carbon black and carbon nanotube, various metal ions such as iron chloride and metal powders are added.

As the binder material, conductive polymers such as polypyrrole, poly thiophene, polyisothianaphthene, polyethylenedioxythiophene, polyacetylene and polyaniline may be used. It is known that conductivity is given to the conductive polymers by adding halogen series additives such as iodine and bromine, and it is possible to change the conductivity with the additives.

In the electrophoretic device 1 according to the embodiment, a resin composition (emulsion or an organic solvent solution) obtained by mixing the permittivity adjuster or the resistivity adjuster into the binder material according to needs is applied on the first substrate 11 by various application methods. For example, a roll coater method, a roll laminator method, a screen printing method, a spray method, an ink-jet method and the like can be adopted to apply the composition. A film is formed by this application, and the second substrate 12 is then placed such that the film contacts with the transparent electrode 24. In this way, the electrophoretic device 1 in the embodiment is formed.

The first substrate 11 may be placed such that the film contacts with the picture electrode 23 after the film is formed on the transparent electrode 24 by providing the above-mentioned resin composition by the above-mentioned method.

Next, the case where the electrophoretic device 1 according to the embodiment is operated is described with reference to FIG. 2.

For convenience of explanation, only a part composing a single picture element of the electrophoretic device 1 is shown in FIG. 2.

Figure 2A:
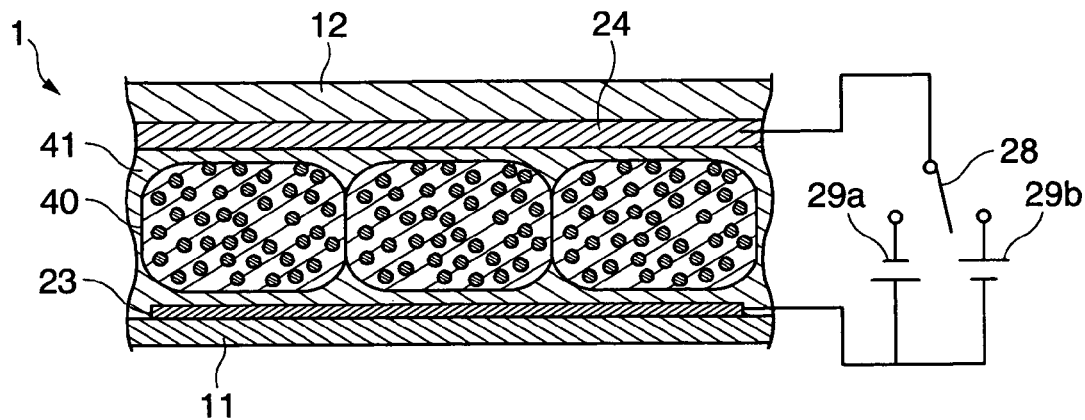
FIGS. 2A though 2C are explanatory drawings when the electrophoretic device is operated.

As shown in FIG. 2A, voltage supplies 29a and 29b that supply a voltage opposite to each other are coupled together through a selector switch 28 in the electrophoretic device 1. In other words, the picture electrode 23 is coupled to one ends of the voltage supplies 29a and 29b, and the transparent electrode 24 is coupled to the other ends of the voltage supplies 29a and 29b through the selector switch 28.

According to such connection, it is possible the direction of the voltage applied between the electrodes 23, 24 by switching the selector switch 28. By changing the direction of the applied voltage, the electrophoretic particle 25 can be collected on the electrode of the desired side. In this way, the display becomes possible.

Figure 2B:
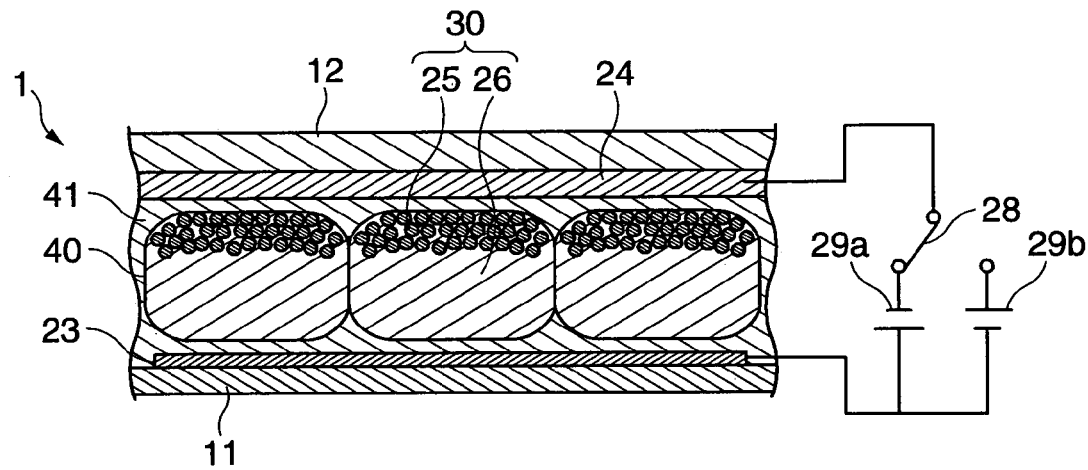

The electrophoretic particle 25 is positively charged in this embodiment. Accordingly, the electrophoretic particle 25 is collected to the transparent electrode 24 side that is closer to an observer when the voltage supplied from the voltage supply 29a is applied as shown in FIG. 2b. At this state, the observer can see the color of the electrophoretic particle 25 from the transparent substrate 12 side.

Figure 2C:
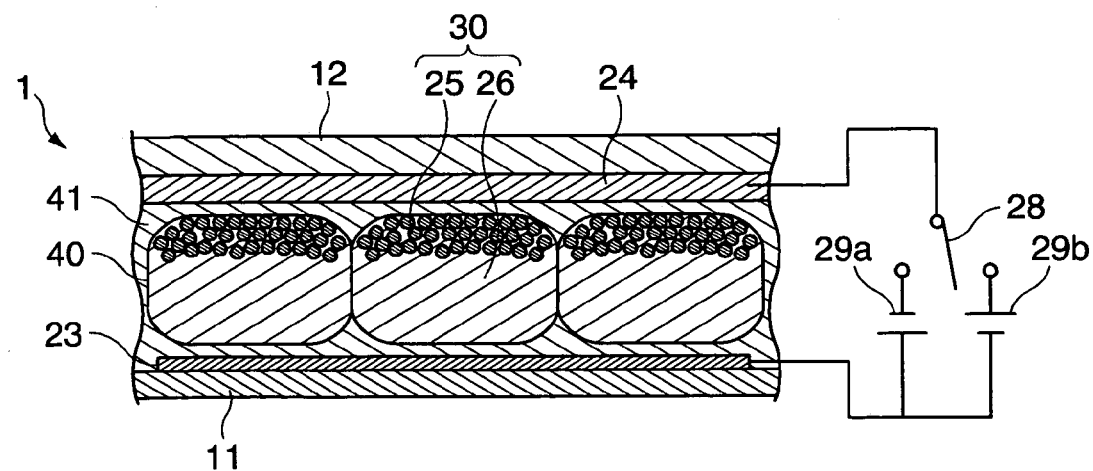
Figure 3A:
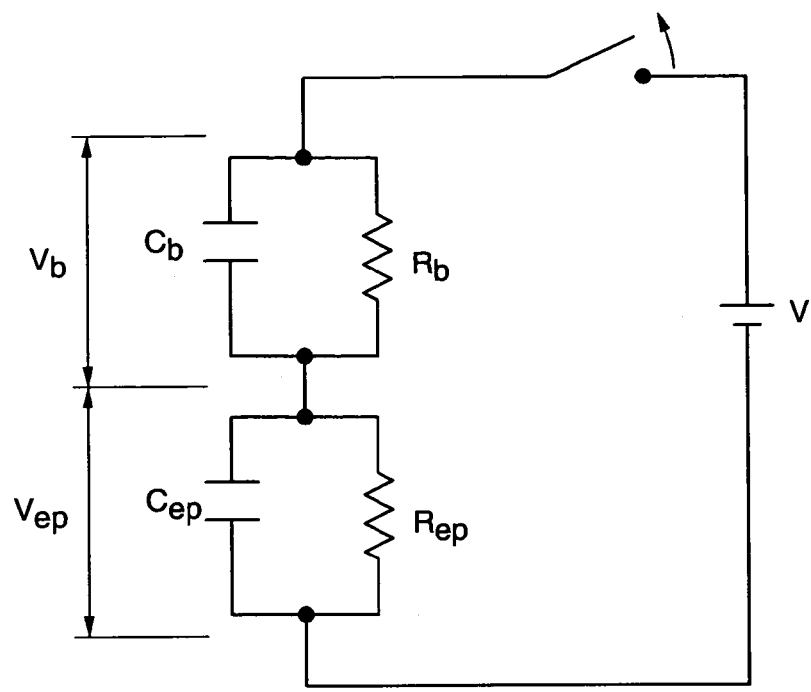
FIG. 3A shows an ideal equivalent circuit and FIG. 3B shows an equivalent circuit that is made in consideration of a leakage pathway.
Figure 3B:
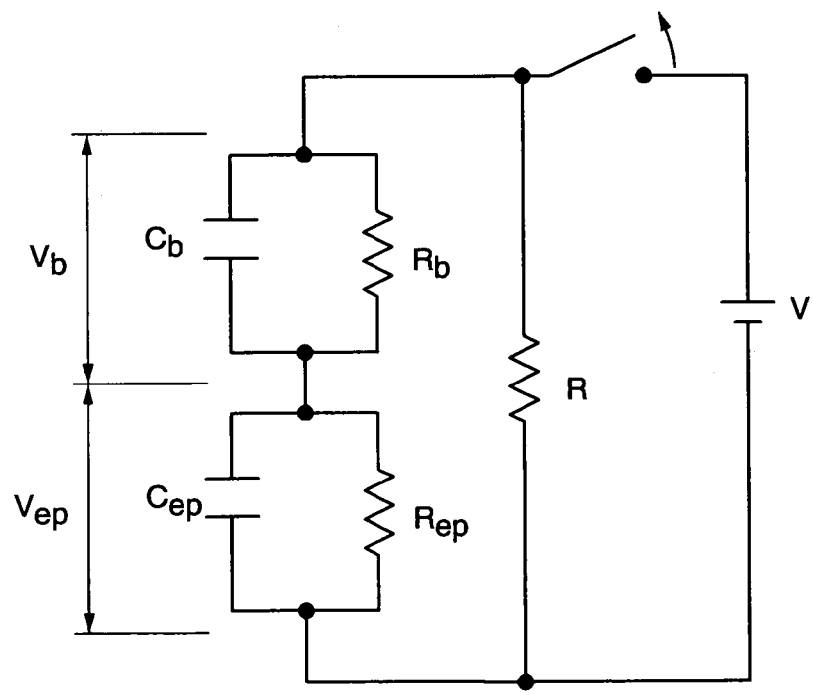

Then, turning the selector switch 28 such that the selector switch 28 is not coupled to the voltage supply 29a, 29b as shown in FIG. 2C. In other words, stop the voltage supply to the electrophoretic device 1.

At this point, the electrophoretic device 1 has the binder layer 41 in which the ratio of the resistance component to the capacitance component satisfies $R_b C_b \leq R_{ep} C_{ep}$, and the electrophoretic dispersion liquid 30. In other words, the electrophoretic device 1 has the binder layer 41 in which the ratio of the resistivity component or the relative permittivity component satisfies $\sigma_b \epsilon_b \leq \sigma_{ep} \epsilon_{ep}$, and the electrophoretic dispersion liquid 30.

This prevents the voltage (electric field) applied to the electrophoretic dispersion liquid 30 from being reversed. Accordingly, the electrophoretic particle 25 contained in the electrophoretic dispersion liquid 30 dose not move and is retained at a predetermined position as shown in FIG. 2C.

In this way, it is possible to prevent the contrast deterioration caused by the movement of the electrophoretic particle 25.

The electrophoretic particle 25 can be collected to the picture electrode 23 side that is placed distant from the transparent substrate 12 side when the voltage supplied from the voltage supply 29b is applied. At this state, the observer (those who see the display of the electrophoretic device) can see the color of the liquid dispersion medium 26.

In the case that the electrophoretic particle 25 is negatively charged, the direction in which the particle moves becomes opposite to the case described above.

According to the structure described above with reference to FIGS. 2A through 2C, it is possible to display two different colors corresponding to the direction in which the voltage is applied. As mentioned above, the part shown in FIG. 2 is a single picture element. The same operation is carried out in each pixel arranged in matrix and a desired image can be displayed in the electrophoretic device 1.

Therefore, it is possible to provide the electrophoretic device 1 in which the contrast deterioration is prevented in every pixel.

ANALYSIS EXAMPLE

Next, an analysis example in the above-described simulation is described.

Figure 4A:
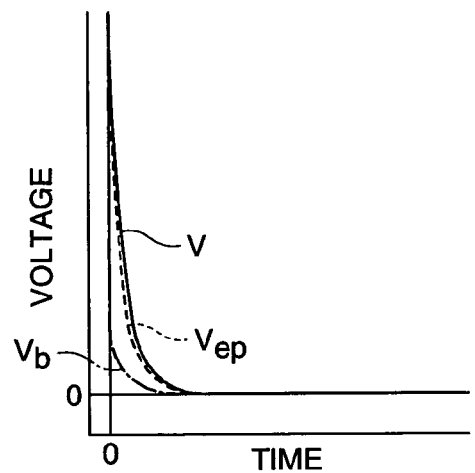
FIGS. 4A though 4C show analysis results of a simulation.

FIGS. 4A though 4C are graphs showing a transient characteristic of the voltage applied to the electrophoretic dispersion liquid or the binder layer when the voltage applied to the electrodes is turned off by replacing the electrophoretic device with an equivalent circuit that is made in consideration of a leakage pathway.

In the graphs shown in FIGS. 4A though 4C, $V_b$ denotes the voltage applied to the binder layer, $V_{ep}$ denotes the voltage applied to the electrophoretic dispersion liquid, and V denotes the voltage applied between the electrodes.

A condition of this simulation is that constants of the electrophoretic dispersion liquid and the binder layer of the hitherto known electrophoretic device are as follows: $C_{ep}$=200 pF, $R_{ep}$=1 GΩ, $C_b$=100 pF and $R_b$=3 GΩ.

Figure 4B:
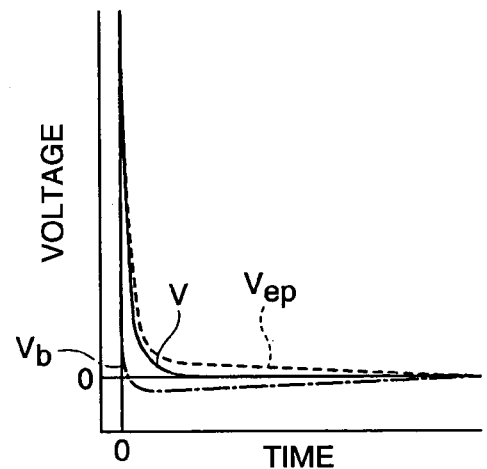
Figure 4C:
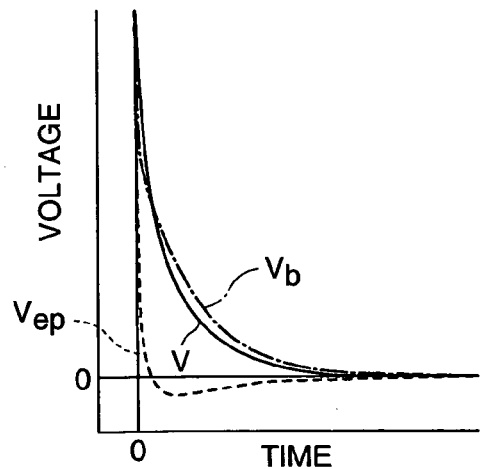

In the hitherto known electrophoretic device, the ratio of the above-mentioned constants becomes $R_b C_b > R_{ep} C_{ep}$, and the direction of the voltage $V_{ep}$ applied to the electrophoretic dispersion liquid gets reversed as shown in FIG. 4C. Therefore, the electrophoretic particle contained in the electrophoretic dispersion liquid is pulled towards the direction of the opposite polarity, causing the contrast deterioration.

When $R_b$ is reduced to 2 GΩ in order to make $R_b C_b = R_{ep} C_{ep}$, it is confirmed that the reversal phenomenon of the voltage applied between the electrodes does not occur as it can tell from the transient characteristic shown in FIG. 4A.

When $R_b$ is reduced to the value that is smaller than 2 GΩ ($R_b C_b < R_{ep} C_{ep}$), it is confirmed that the reversal phenomenon of the voltage applied to the binder layer occurs as shown in FIG. 4B.

Here, even when the direction of the voltage applied to the binder layer is reversed, the direction of the electric field applied to the electrophoretic particle contained in the electrophoretic dispersion liquid will not be changed.

At the state of $R_b C_b = R_{ep} C_{ep}$, the voltage reversal could occur ($R_b C_b > R_{ep} C_{ep}$) even with, for example, a slight increase in the value of $R_b$. Therefore, it is preferred that time constants of the electrophoretic device are adjusted so as to satisfies $R_b C_b > R_{ep} C_{ep}$ by, for example, using the binder layer that makes the value of $R_b$ smaller.

From the simulation, it is confirmed that the electrophoretic particle stays still in the electrophoretic device consisting of the electrophoretic dispersion liquid and the binder layer that satisfy the above-mentioned ratio $R_b C_b \leq R_{ep} C_{ep}$ even when the voltage application to the electrodes stops. Therefore, it is possible to prevent the contrast from being deteriorated.

Electronic Equipment

Figure 5:
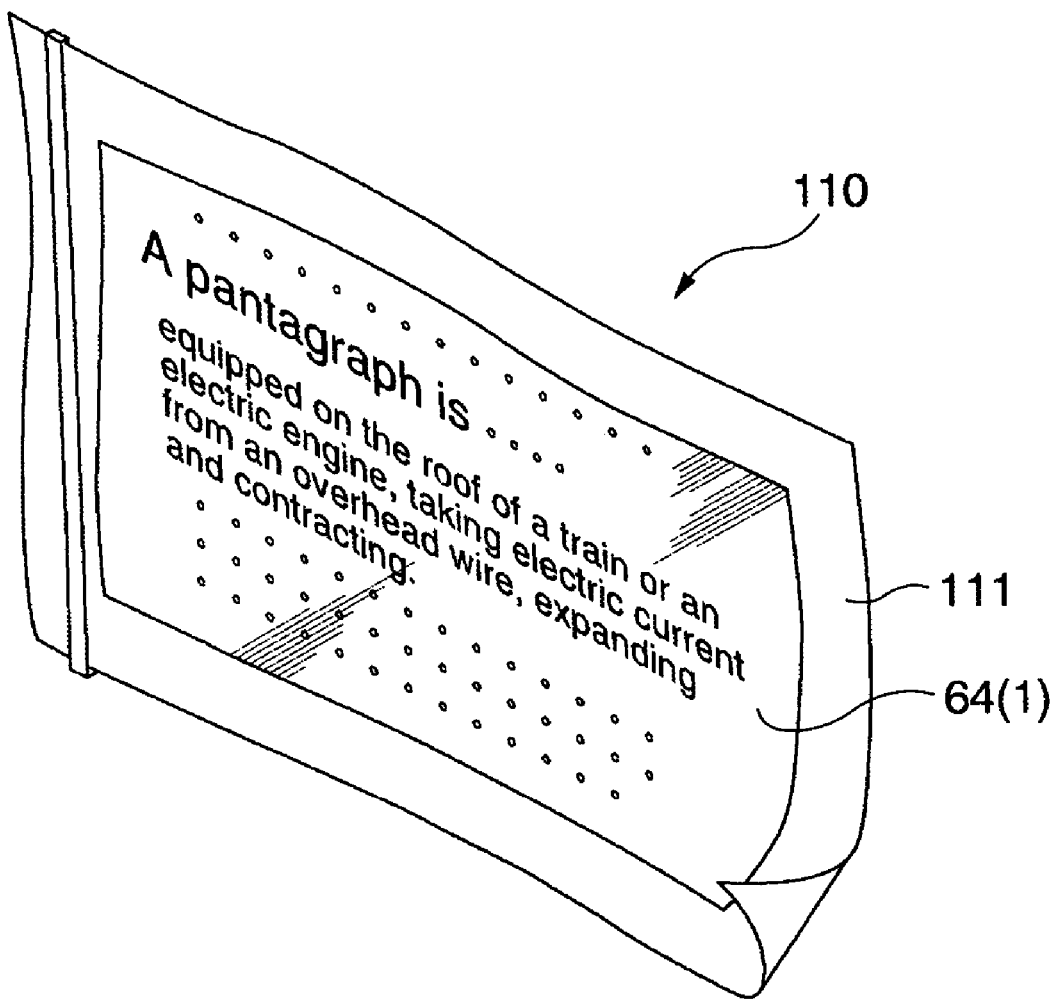
FIG. 5 is a sectional view of an embodiment of electronic equipment.

Next, as an example of electronic equipment of the invention, the case where the electrophoretic device 1 according to the embodiment is applied to a flexible electronic paper is explained. FIG. 5 is a perspective view of the electronic paper showing its structure. The reference numeral 110 denotes the electronic paper in FIG. 5. The electronic paper 110 has a main body 111 having texture like paper and flexibility and a display part 64 in which the above-described electrophoretic device 1 as a display means. According to this electronic equipment, it is possible to prevent the contrast deterioration when the voltage application to the electrodes stops because it has the display part 64 which is the above-described electrophoretic device 1 used as a display means. With the electrophoretic device 1, a clear and sharp image can be displayed. Therefore, it is possible to provide the highly reliable electronic equipment with a high display capability.

The electrophoretic device according the embodiment of the invention can be applied not only to the electronic paper 110 but also to various electronic equipments. The substrate of the electrophoretic device is not necessarily flexible as long as the other substrate is transparent.

As such electronic equipment, for example, there are an electronic book, a personal computer, a digital still camera, a view finder type or direct view type video tape recorder, a car navigation device, a pager, an electronic databook, a calculator, a word processor, a work station, a videophone, a point-of-sale (POS) terminal, equipments having a touch panel and the like. The above-described electrophoretic device can be applied to the display means of these electronic equipments.

Although the embodiments of the invention have been fully described by way of example with reference to the accompanying drawings, it is to be understood that the embodiments described hereunder do not in any way limit the scope of the invention but various changes and modifications will be applied within the scope and spirit of the invention.

The entire disclosure of Japanese Patent Application No. 2005-046702, filed Feb. 23, 2005 is expressly incorporated by reference herein.

What is claimed is:

1. An electrophoretic device, comprising:

a pair of electrodes;

an electrophoretic dispersion liquid including an electrophoretic particle and a dispersion medium and having electric properties of electric resistance $R_{ep}$ and capacitance $C_{ep}$;

a microcapsule in which the electrophoretic dispersion liquid is enclosed and provided between the pair of the electrodes; and a binder layer fixing the microcapsule between the electrodes and having electric properties of electric resistance $R_b$ and capacitance $C_b$, and wherein a ratio of the electric properties of the electrophoretic dispersion liquid and the binder layer satisfies a relationship $R_b C_b \leq R_{ep} C_{ep}$.

2. The electrophoretic device, according to claim 1, a ratio of the resistivity to the relative permittivity of the electrophoretic dispersion liquid and the binder layer satisfies a relationship $\sigma_b \epsilon_b \leq \sigma_{ep} \epsilon_{ep}$ where $\sigma_b$ is resistivity of the binder layer, $\epsilon_b$ is relative permittivity of the binder layer, $\sigma_{ep}$ is resistivity of the electrophoretic dispersion liquid and $\epsilon_{ep}$ is relative permittivity of the electrophoretic dispersion liquid.

3. The electrophoretic device, according to claim 2, wherein a resistivity adjuster that lowers the binder layer resistivity $\sigma_b$ is added to the binder layer.

4. The electrophoretic device, according to claim 2, wherein a permittivity adjuster that lowers the binder layer relative permittivity $\epsilon_b$ is added to the binder layer.

5. An electronic equipment, comprising the electrophoretic device according to claim 1 as a display means.

* * * * *